United States Patent [19]

Goebel

[11] 4,026,338

[45] May 31, 1977

[54] RETRACTOR FOR ONE-WAY SCREW

[76] Inventor: Ronald G. Goebel, 3145 W. Arkansas Ave., Denver, Colo. 80219

[22] Filed: Apr. 26, 1976

[21] Appl. No.: 680,104

[52] U.S. Cl. .................................. 145/50 A
[51] Int. Cl.² .................................. B25B 15/00
[58] Field of Search .................. 145/50 A, 50 B

[56] References Cited

UNITED STATES PATENTS

| 685,197 | 10/1901 | Barnes | 145/50 A |
| 1,448,392 | 3/1923 | Earnshaw | 145/50 A |
| 2,577,193 | 12/1951 | Imse | 145/50 A |
| 2,684,094 | 7/1954 | Lissy | 145/50 A |

FOREIGN PATENTS OR APPLICATIONS 154,715  12/1920  United Kingdom ............. 145/50 A Primary Examiner—James L. Jones, Jr.
Assistant Examiner—J. T. Zatarga
Attorney, Agent, or Firm—Bertha L. MacGregor; Kyle W. Rost

[57] ABSTRACT

A shaft having a pair of oppositely angled projections on one end engages the head of a one-way screw for retracting the screw by rotation of the shaft. The shaft may integrally carry a stabilizing blade provided with said projections and assist in holding them in place against the screw head while the shaft is struck with a hammer to drive the projections into the screw head. A handle may be attached to the shaft, but the end of the shaft extends through the handle to be exposed so that the shaft may be struck by the hammer.

3 Claims, 5 Drawing Figures

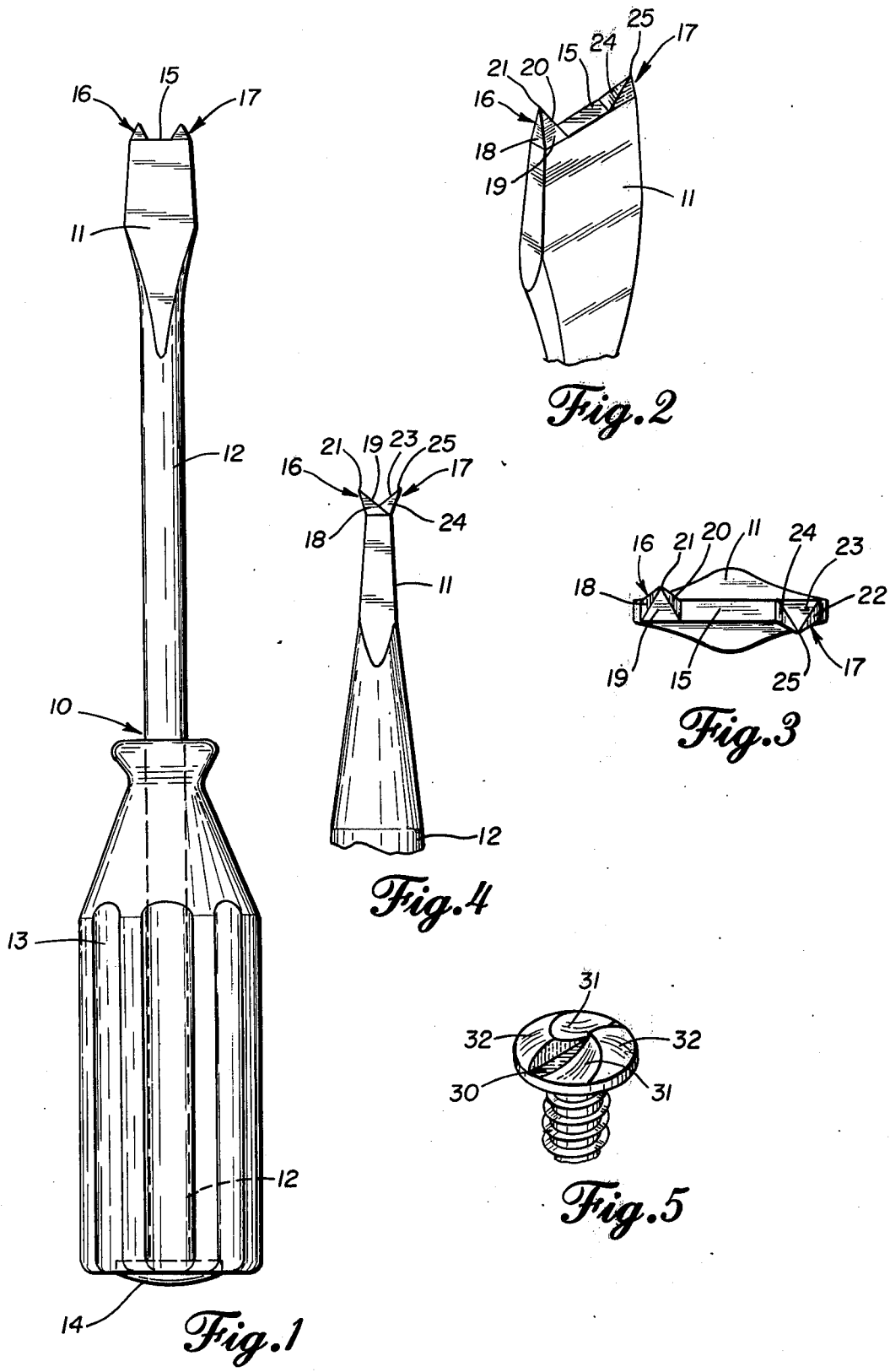

RETRACTOR FOR ONE-WAY SCREW

BACKGROUND OF THE INVENTION

1. Field of the Invention

The invention relates to tools for removing screws. The invention also relates to locksmith's tools and tools for removing one-way screws.

2. Description of the Prior Art

The one-way or nonretractable screw is disclosed in U.S. Pat. No. 131,843 to Brooks, in 1872, and remains in commercial use today. A number of other one-way screws have been patented since the Brooks, but the Brooks screw appears to be the only structure widely used. The one-way screw is used to secure any hardware item that is intended to be nonremovable, for example hinges and latches in public places where a person could have the opportunity to remove the item unobserved. In addition, locksmiths use one-way screws to secure locks and dead bolts, thereby preventing an intruder from removing the lock or dead bolt with an ordinary screw driver.

While the one-way screw successfully resists many removal attempts, at times the screws must be removed in order to replace or service the mounted lock or other hardware piece. In locations where the screw head is at the bottom of a narrow well, drilling may be the only practical method of removal. In more accessible locations, the screw can be slowly removed with a punch. Neither method is satisfactory because of the long time necessary to accomplish the job.

Others seeking to remedy the problem have designed one-way screws having modifications allowing the use of special tools to remove the screw. For example, U.S. Pat. No. 3,673,912 to Herr discloses a Brooks style one-way screw with a special notch along the slot of the screw. The Herr patent then discloses a special screw driver having a notch engaging projection for removing the screw. While the described modification and special tool provide one possible solution to the removal problem, it is of no aid in removing presently installed Brooks style screws.

SUMMARY OF THE INVENTION

A tool for retracting one-way screws has a shaft with a double pointed tip. The tip may be similar to a conventional screw driver blade with added projections near the blade corners. The tool is used by placing the projections on the outwardly curved surfaces of a one-way screw head and tapping the shaft of the tool, thereby driving the projections into the screw head. The tool may then be rotated to retract the one-way screw in the customary manner for ordinary screws.

An object of the invention is to provide means for retracting one-way screws through the rotation of a single shaft. The tool may be of a size similar to the screwdriver used to insert a one-way screw and therefore can reach and retract such screws regardless of whether the screw head is in a deep well.

A further important object is to provide means for simultaneously engaging both of the oppositely disposed outwardly curving surfaces of a one-way screw. The present invention engages both curved surfaces of the screw head and allows the screw to be turned from a single shaft.

DESCRIPTION OF THE DRAWINGS

FIG. 1 is a side elevational view of the tool.

FIG. 2 is a perspective view of the operative head of the tool.

FIG. 3 is an end elevational view of the head of the tool.

FIG. 4 is a side elevational view of the tool end, rotated 90° from the view of FIG. 1.

FIG. 5 is a perspective view of a one-way screw.

DESCRIPTION OF THE PREFERRED EMBODIMENT

The retracting tool 10 may be constructed to resemble a standard screw driver as shown in FIG. 1. The main features of this embodiment include a broad screw driver style blade 11 connected to a shaft 12 that extends from the blade 11 for the length of the tool 10. A handle 13 may be attached to the end of shaft 12 to provide convenient means for turning the shaft, but the shaft should extend substantially through the handle to allow end 14 to be struck without fracturing the handle 13. When the tool is struck on end 14, double punch means such as projections 16 and 17 on the end 15 of blade 11 are driven into the head of a one-way screw and allow the screw to be retracted by turning the tool 11 like an ordinary screw driver.

The preferred configuration of projections 16 and 17 is shown in FIG. 2–4. Projection 16 extends from one side of blade end 15 and may have a beveled outside edge 18, side edge 19, and inside edge 20, all coming together at point 21. Similarly, projection 17 extends from end 15 at the side opposite projection 16 and has outside edge 22, side edge 23 and inside edge 24 coming together at point 25. As best seen in FIG. 4 and 5, projections 16 and 17 may be angled in a clockwise direction about the axis of shaft 12 when viewed from end 15, placing the points 21 and 25 in position mutually protruding in advance of blade 11 when the tool 10 is turned to unscrew a screw.

A typical one-way screw as shown in FIG. 5 has a head with slot 30 for receiving a screw driver blade. Two oppositely disposed raised portions 32 border slot 30 to be acted upon by a screw driver twisting in a first direction, for example in a clockwise direction. Two oppositely disposed curved camming sections 31 also border slot 30 for urging a screw driver blade out of slot 30 when the screw driver is twisted in a second and opposite direction, for example in a counterclockwise direction. While tool 10 is designed to retract this type of one-way screw, it is applicable to a variety of other one-way screws.

In operation tool 10 is inserted at blade 11 into slot 30 and projections 16 and 17 contact curved surfaces 31. End 14 of shaft 12 is then struck with a hammer, driving projections 16 and 17 into surfaces 31. The impressions made in surfaces 31 by the projections provide enough bite for the tool to retract the one-way screw by twisting the tool in a counterclockwise direction. The projections act at opposite sides of the screw axis to allow the screw to be turned from the twisting of a single shaft 12, thereby allowing the tool 10 to remove screws even from deep wells where drilling was previously the only practical method of removing the screw.

The angle of the projections 16 and 17 about the axis of shaft 12 allows the projections to contact the curved surfaces 31 and apply retracting force to the screw more directly than would be possible if the projections were not angled. In addition, the projections are better able to withstand the twisting of tool 10 when they angle into the surface of the curves 31. Having the projections on the corners of a blade 11 provides stability when hammering the projections into the screw head, since the blade rests against raised portions 32, and prevents the projections from slipping down the curved surfaces 31. The exact width of blade 11 and the angle of projections 16 and 17 is variable.

I claim:

1. A retractor for intactly removing one-way screws of the type having a head with a central slot and having diametrically opposed on each side of the slot a raised shoulder and an outwardly curved camming surface, each shoulder being directly across the slot from the camming surface of the opposite side, the shoulders allowing the screw to be driven in a first direction by a standard screwdriver, and the camming surface curving from the floor of the slot for urging a standard screwdriver blade out of the slot when turned in a second and opposite direction comprising:

a. a shaft having a first end;
 b. two projections on said first end of the shaft, each projection terminating in an axially extending point, the projections being laterally and angularly oppositely disposed relative to a plane passing through both projections and the axis of the shaft such that the points mutually protrude in advance of the first end when the retractor is turned to unscrew the screw, and
 c. said two projections contacting respectively the two diametrically opposed camming surfaces of the one-way screw for impact initiated engagement through force applied axially through said shaft.

2. The retractor of claim 1, further comprising stabilizing means for contacting the shoulders of the one-way screw within the slot and maintaining said points in a fixed position on the camming surfaces of the screw while impact is applied to said shaft.

3. The retractor of claim 2, wherein said stabilizing means comprises a blade on the first end of said shaft, the blade having first and second opposed broad faces, each of which is adapted to engage a corresponding shoulder of the one-way screw at a portion of the blade face, and wherein said pointed projections extend axially from the tip of the blade at opposite ends of the tip and extend laterally, one point extending in the direction of each of said broad faces and engaging the camming surface across the screw slot from the shoulder engaged by the opposite broad face of the blade, each blade face providing support to the projection extending in the direction of the opposing blade face as impact is applied to the shaft.

* * * * *